United States Patent Office.

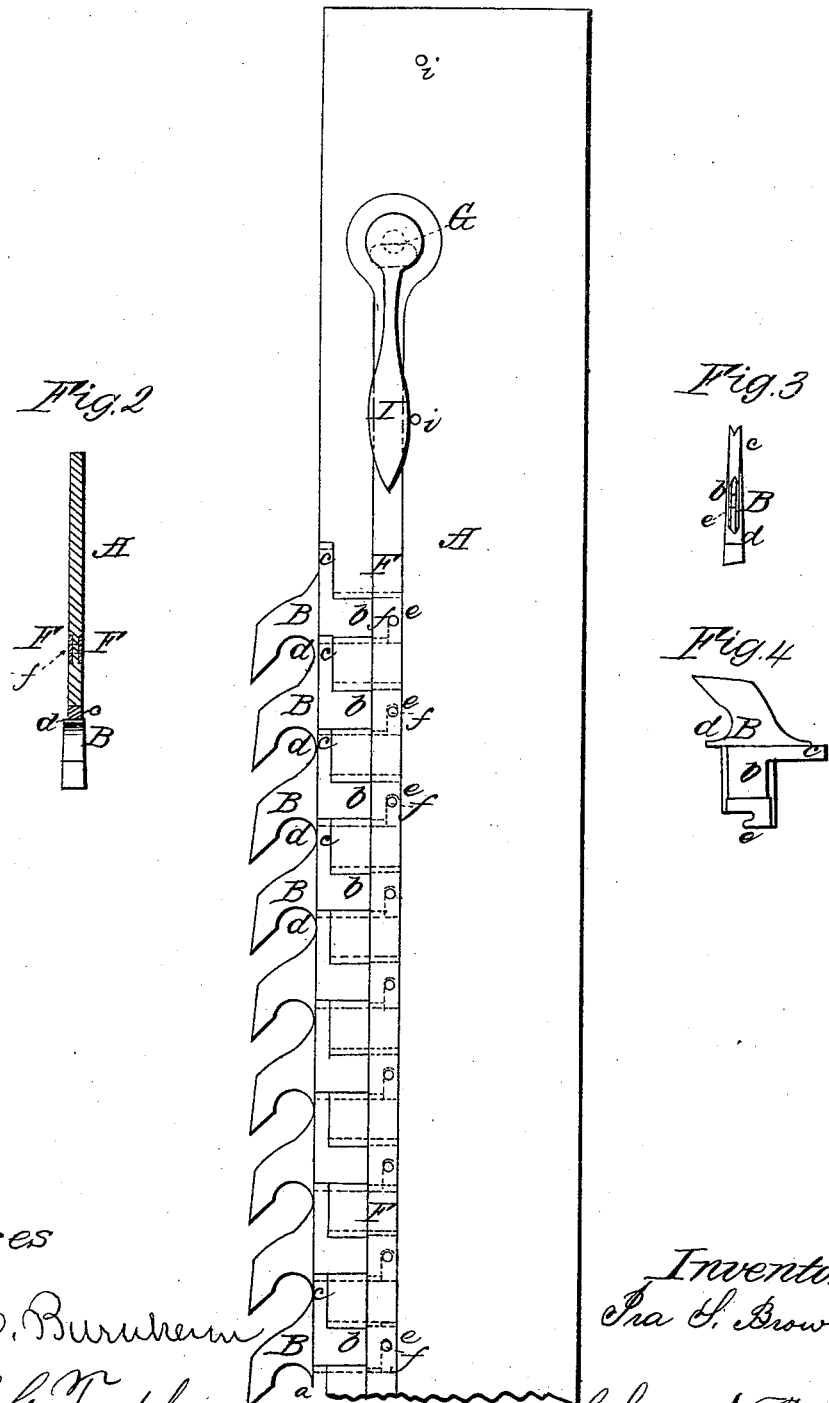

IRA S. BROWN AND CHARLES N. BROWN, OF PROVIDENCE, RHODE ISLAND, ASSIGNORS TO THEMSELVES AND J. MASON GROSS, OF SAME PLACE.

Letters Patent No. 61,513, dated January 29, 1867.

IMPROVEMENT IN SAWS.

*The Schedule referred to in these Letters Patent and making part of the same.*

TO ALL WHOM IT MAY CONCERN:

Be it known that we, IRA S. and CHARLES N. BROWN, of the city and county of Providence, and State of Rhode Island, have invented certain new and useful improvements in Reciprocating Saws; and we do hereby declare that the following is a full and exact description of the same, reference being had to the accompanying drawings, in which—

Figure 1 is a side elevation of a portion of our improved saw, and showing the peculiarities thereof.

Figure 2 is a cross-section of the same.

Figure 3 is a rear view of a detached tooth; and

Figure 4 is a side view of the same.

Circular saws have repeatedly been made with detachable teeth, whereby many advantages have accrued, such as a ready renewal of broken or worn teeth, a tooth better adapted for its work than could easily be made of the plate, capability of being ground instead of filed when sharpening is required, whereby a much harder and more durable cutting edge is secured, and the avoidance of the reduction in the size of the saw consequent upon the frequent filings previously required. Reciprocating saws are preferable for sawing lumber, to the rotary saw, as they produce a truer surface and waste a smaller percentage of the stock in dust. But as it is impracticable to give such saws the high velocity which is perfectly feasible with a circular saw, in order to render them nearly as efficient as the latter, a larger number of teeth in the same linear space is necessary, and this close setting of the teeth has rendered the adoption of inserted teeth so difficult as to heretofore prevent the realizing the same advantages in this class of saws which have resulted from the adoption of independent removable teeth in circular saws.

The nature of our invention consists in so constructing the teeth of saws that they shall interlock, each with those adjacent thereto, so as to be mutually supporting and sustaining, whereby it is rendered practicable to construct a saw with inserted teeth sufficiently near together to permit of their adaptation to reciprocating saws, and the structure is rendered more secure and firm than could be done by any style of inserted teeth heretofore known. The nature of our invention also consists in so arranging a series of removable teeth in combination with a locking device, that several or all the teeth may be securely fastened by a single lock, whereby the facilities for removing the teeth for grinding are greatly increased, and the construction of the saw simplified. The nature of our invention also consists in a reciprocating saw having removable teeth, substantially of the character described, as a new article of manufacture and sale.

To enable others skilled in the art to make and use our invention, we will proceed to describe the construction and operation of the same by reference to the drawings.

A is a saw-plate of any desired length and width, and adapted to be hung in and operated by a gate in the usual manner. The teeth, B, are separate from the plate, each tooth being a distinct piece, and fitted with a shank, b, to snugly fill a square recess in the edge of the plate, as shown. Each tooth B, besides its root or shank b, has two projections, one, c, extending backward to the next tooth and interlocking therewith, and the other, d, reaching over and resting upon the projection c of the preceding tooth. Thus it will be seen that each tooth interlocks with the teeth on either side of it in such a manner that it holds the tooth immediately preceding it from being removed from the plate, and it is, in its turn, held in a like manner by the succeeding tooth. The projection c, interlocking with the shank b of the succeeding tooth, gives a rigidity to the structure beyond what could be obtained in the narrow limits allowed for the shank b, where the teeth are necessarily so thickly set, as in a reciprocating saw. To remove any one tooth from the plate, it will be observed that all the teeth above or behind it must first be removed, which fact gives great security against the accidental loosening of the teeth in use. The end of the shank b is formed into a hook, e, as more plainly shown in fig. 4. On each side of the saw-plate A, and covering the hooks e of the teeth, a strip, F, is let in flush with the surface, as shown in section in fig. 2. Rivets, f, passing through these two strips F, immediately before each hook e, serve to bind the strips F, and hold them firmly in place, and when the strips F are moved so as to bring the rivets f within the hooks e of the teeth B, as shown in fig. 1, each tooth is firmly locked and held independently of any other, in addition to the mutual support described above. To operate these strips F we employ an eccentric, G, at the upper end thereof, which eccentric is rotated by the handle I, and is connected to the strips F and the plate A, so that by rotating the handle I through one-half a revolution, an end motion is imparted to the strips F in a manner familiar to mechanics. Stops, $i\ i$, are provided to prevent the handle I from making more than one-half a revolution, and this handle is so arranged relatively to the eccentric G, that when the teeth are locked it hangs down, as represented, whereby the weight of the said handle assists to hold the locking device in place and prevent an accidental loosening of the teeth. A portion of the teeth B may be made to act as planes fo smoothing the kerf, if desired, or the saw may be readily changed from a plain saw into a planing saw, by removing and resetting the teeth; and the teeth may be removed and sharpened without disturbing the plate or its fastening in the gate. A number of these saws may be used together, forming "gangs," to better advantage than the ordinary reciprocating saw, because of the ability to remove the teeth and sharpen them without altering or disturbing the position of the plates.

Having now fully described our invention, what we claim as new therein, and desire to secure by Letters Patent, is—

1. We claim a saw-tooth B, so constructed as to interlock with the tooth on either side thereof, and mutually sustain and be sustained by such adjacent teeth, substantially in the manner herein set forth.

2. We also claim the arrangement of the locking device F $f$ G, or equivalent mechanism, by which several or all of the teeth may be fastened by one operation, substantially as above described.

IRA S. BROWN,
CHAS. N. BROWN.

Witnesses:
  GEO. H. BURNHAM,
  WILLIAM H. G. TEMPLE.